(12) United States Patent
Kiguchi

(10) Patent No.: US 11,020,809 B2
(45) Date of Patent: Jun. 1, 2021

(54) MACHINING JIG AND PROCESSING METHOD

(71) Applicant: Sumitomo Electric Sintered Alloy, Ltd., Takahashi (JP)

(72) Inventor: Hirofumi Kiguchi, Takahashi (JP)

(73) Assignee: SUMITOMO ELECTRIC SINTERED ALLOY, LTD., Takahashi (JP)

( * ) Notice: Subject to any disclaimer, the term of this patent is extended or adjusted under 35 U.S.C. 154(b) by 192 days.

(21) Appl. No.: 16/313,624

(22) PCT Filed: Jun. 26, 2017

(86) PCT No.: PCT/JP2017/023334
§ 371 (c)(1),
(2) Date: Dec. 27, 2018

(87) PCT Pub. No.: WO2018/003721
PCT Pub. Date: Jan. 4, 2018

(65) Prior Publication Data
US 2019/0143429 A1    May 16, 2019

(30) Foreign Application Priority Data
Jun. 30, 2016   (JP) .............................. JP2016-131072

(51) Int. Cl.
*B23B 31/02*   (2006.01)
*B23F 23/06*   (2006.01)
*B23F 5/20*    (2006.01)

(52) U.S. Cl.
CPC ................ *B23F 23/06* (2013.01); *B23F 5/20* (2013.01)

(58) Field of Classification Search
CPC ........... B23F 23/06; B23F 5/20; B23F 15/005
See application file for complete search history.

(56) References Cited

U.S. PATENT DOCUMENTS 2,812,186 A * 11/1957 Carlsen ................. B23B 31/302
279/2.03

FOREIGN PATENT DOCUMENTS

| CN | 204912955 U | 12/2015 |
| JP | 55-66725 U1 | 10/1978 |
| JP | 01-199720 A | 8/1989 |
| JP | 2004-323939 A | 11/2004 |

(Continued)

OTHER PUBLICATIONS

English translation of JP2005-288564 (Year: 2005).*
English translation of JP55-066725 (Year: 1978).*

*Primary Examiner* — Jun S Yoo
(74) *Attorney, Agent, or Firm* — Renner, Otto, Boisselle & Sklar, LLP

(57) ABSTRACT

A machining jig holds a workpiece with respect to a tool when machining the workpiece with the tool, the workpiece including a ridge that projects from an outer periphery of a cylindrical section in a radial direction and that extends so as to intersect a peripheral direction. The machining jig includes a holding jig that includes a cylindrical body section that is disposed at an outer periphery of the workpiece and a stopping section that projects inwardly from the body section and that stops a face of a surface of the ridge on a side where the tool leaves a processing portion of the ridge; and a coaxial base that is coaxial with the holding jig and to which the holding jig is coaxially fixed.

7 Claims, 5 Drawing Sheets

(56) References Cited

FOREIGN PATENT DOCUMENTS

| | | |
|---|---|---|
| JP | 2005-288564 A | 10/2005 |
| JP | 2013-233568 A | 11/2013 |

\* cited by examiner

MACHINING JIG AND PROCESSING METHOD

TECHNICAL FIELD

The present invention relates to a machining jig and a processing method. This application claims priority based on Japanese Patent Application No. 2016-131072 filed on Jun. 30, 2016, the entire contents of which are incorporated herein by reference.

BACKGROUND ART

As a method of manufacturing components that are difficult to compact with a die, Japanese Literature 1 discloses a method in which a powder raw material is subjected to lubrication compacting by using a die (a lubricant is caused to adhere to the die to perform compacting), the obtained compact is machined, for example, cut or ground, and the compact that has been machined is sintered. Japanese Literature 2 discloses a die that forms a compact by compacting, the compact including gears provided in two levels and having different diameters (large teeth and small teeth).

CITATION LIST

Patent Literature

PTL 1: Japanese Unexamined Patent Application Publication No. 2004-323939
PTL 2: Japanese Unexamined Patent Application Publication No. 2013-233568

SUMMARY OF INVENTION

A machining jig according to the present disclosure holds a workpiece with respect to a tool when machining the workpiece with the tool, the workpiece including a ridge that projects from an outer periphery of a cylindrical section in a radial direction and that extends so as to intersect a peripheral direction. The machining jig includes a holding jig that includes a cylindrical body section that is disposed at an outer periphery of the workpiece and a stopping section that projects inwardly from the body section and that stops a face of a surface of the ridge on a side where the tool leaves a processing portion of the ridge; and a base that is coaxial with the holding jig and to which the holding jig is fixed.

A processing method according to the present disclosure is such that a workpiece including a ridge that projects from an outer periphery of a cylindrical section in a radial direction and that extends so as to intersect a peripheral direction is machined with a tool such that a processing surface is formed in a direction that intersects a longitudinal direction of the ridge. The processing method includes, by using the machining jig according to the present disclosure above, stopping the surface of the ridge by the stopping section near a processing portion of the workpiece in an axial direction, and performing processing with the tool from a side opposite to a side where the ridge is stopped by the stopping section.

DESCRIPTION OF EMBODIMENTS

Technical Problem

Figure 1:
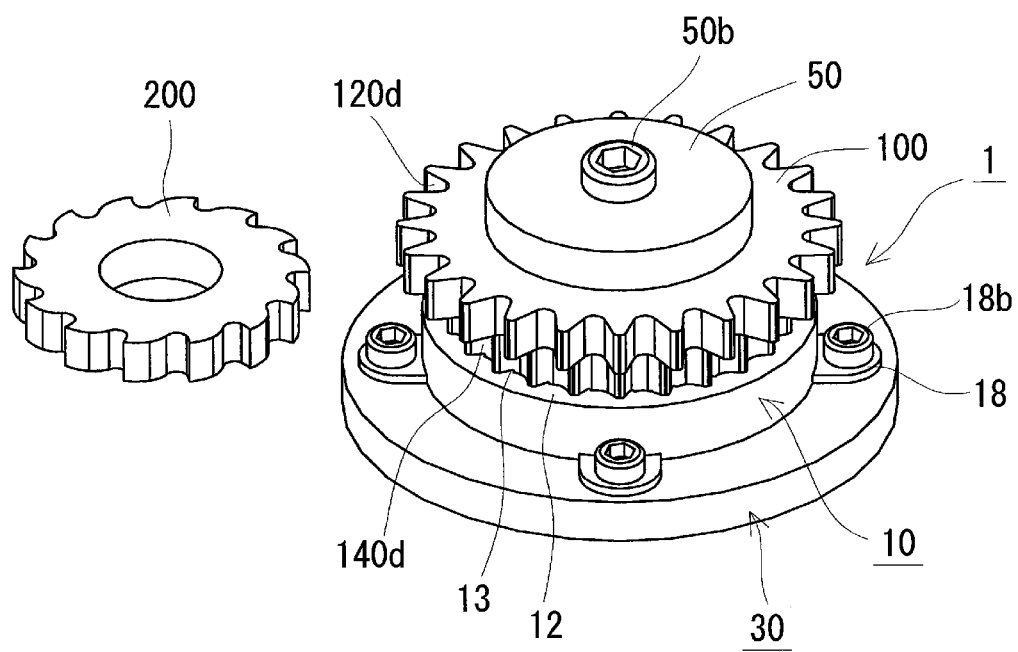
FIG. 1 is a schematic perspective view showing a machining jig of a first embodiment.

In the method of Patent Literature 1 above, by machining to form a compact having a hardness that is lower than the hardness of a sintered body, the machining is facilitated. The compact formed by compacting using the die in Patent Literature 2 above is machined after being sintered, an excess toothed portion (small teeth) of the gear is removed, and a circular cylindrical section is formed, thereby forming a double tooth sprocket in which the circular cylindrical section not having a toothed portion exists between the two gears having different diameters (large teeth and small teeth).

With, for example, improving the productivity of sintered components as a purpose, there is a demand for machining under severe conditions, such as increasing processing speed. However, when a compact prior to sintering is machined under severer conditions, it may be difficult to maintain good quality due to, for example, part of the compact breaking. In particular, when the toothed portion of the gear is to be removed, a portion on a side where a tool leaves the toothed portion tends to break.

Accordingly, an object is to provide a machining jig that is capable of reducing breakage caused by machining and that provides excellent productivity. Another object is to provide a processing method that is capable of reducing breakage caused by machining and that provides excellent productivity.

Advantageous Effects of Invention

The machining jig and the processing method according to the present disclosure are capable of reducing breakage caused by machining and provide excellent productivity.

DESCRIPTION OF EMBODIMENTS OF PRESENT INVENTION

First, the contents of embodiments of the present invention are listed and described.

(1) A machining jig according to embodiments of the present invention holds a workpiece with respect to a tool when machining the workpiece with the tool, the workpiece including a ridge that projects from an outer periphery of a cylindrical section in a radial direction and that extends so as to intersect a peripheral direction. The machining jig includes a holding jig that includes a cylindrical body section that is disposed at an outer periphery of the workpiece and a stopping section that projects inwardly from the body section and that stops a face of a surface of the ridge on a side where the tool leaves a processing portion of the ridge; and a base that is coaxial with the holding jig and to which the holding jig is fixed.

The above machining jig is capable of stopping the face (may hereunder be referred to as "exit-side face") of the surface of the ridge on the side where the tool leaves the processing portion of the ridge. Therefore, by machining the vicinity of a portion of the ridge that has been stopped, it is possible to suppress breakage of the ridge caused by the machining. When the workpiece is machined, such as, cut or ground, a shearing force is produced due to a pressing force produced by the tool. When the ridge is machined, the exit-side face of the ridge, in particular, a ridge line between the exit-side face and a processing surface tends to break due to the shearing force. Therefore, by stopping the exit-side face of the ridge by the stopping section at the machining jig, it is possible to receive the shearing force by the stopping section and to reduce breakage caused by the machining. Since the above machining jig allows machining with the ridge stopped by the stopping section, it is possible to reduce, for example, breakage even if machining is performed under severe conditions, such as increasing processing speed. Therefore, processed articles that can be obtained by using the above machining jig are produced with excellent productivity.

Since, in the above machining jig, the holding jig can be fixed coaxially with the base, the holding jig, the base, and the workpiece that is mounted on the holding jig can be coaxially set. Therefore, it is possible to rotate (spin) the workpiece around this axis as a center or swing (revolve) the tool around this axis as the center to easily machine the outer periphery of the workpiece.

The above machining jig is used to mount a workpiece inside the body section of the holding jig⇒finely adjust the workpiece inside the body section in a peripheral direction and stop the ridge by the stopping section⇒machine the vicinity of a portion of the ridge that has been stopped⇒remove the workpiece from the holding jig, to make it possible to easily obtain a processed article after the machining. The above machining jig has a simple jig structure and allows the workpiece to be easily mounted and removed. Therefore, it is expected that the processing of the workpiece by using the above machining jig can be automated by using, for example, a robot.

The above machining jig is capable of suppressing, for example, breakage of the ridge by stopping the exit-side face of the ridge of the workpiece. Therefore, the form of manufacture of the compact does not matter (for example, one obtained by lubrication compacting with a die, one obtained by warm compacting with a die, one obtained by cold compacting with a die, and one in which a lubricant is added to powder). Therefore, by using the above machining jig, it is possible to increase the degree of freedom in the form of the workpiece.

(2) In an example of the above machining jig, the stopping section stops at least a surface of an end-side region of the ridge in a projection direction thereof.

When the ridge is machined, the end-side region of the ridge in the projection direction thereof tends to break.

Therefore, by stopping the surface of the end-side region of the ridge in the projection direction, it is possible to effectively reduce breakage in the ridge.

(3) In an example of the above machining jig, the workpiece has a form of a gear, and the ridge is a toothed portion of the gear.

The above machining jig can be suitably used in machining a workpiece having the shape of a gear. The number of toothed portions of the gear of a workpiece having the shape of a gear is large. However, since the machining jig is capable of individually stopping the exit-side faces of the toothed portions, the machining jig is capable of reducing breakage in each toothed portion and provides excellent productivity.

(4) In an example of the above machining jig, the holding jig is such that a gap is formed between a surface other than the stopping section and a surface of the workpiece.

Since it is possible to form a gap between a surface other than the stopping section and the surface of the workpiece, the workpiece is easily mounted on and removed from the holding jig. Therefore, it becomes easy to mount the workpiece on and remove the workpiece from the holding jig by a robot, and the machining of the workpiece can be easily automated.

(5) An example of the above machining jig further includes a pressing section that presses the workpiece against a side of the holding jig.

By including the pressing section, it is possible to more reliably maintain the state in which the ridge is stopped by the stopping section.

In particular, when a gap is provided between a surface other than the stopping section of the holding jig and the surface of the workpiece, it is possible to suppress any displacement of the workpiece with respect to the holding jig inside the gap.

(6) An example of the above machining jig further includes a circular cylindrical guide section that is coaxial with the holding jig and that is formed on an inner side of the holding jig, wherein an inside diameter of the body section is larger than a tip circle diameter of the toothed portion, the number of the stopping sections is same as the number of the toothed portions, an axial-direction thickness of the stopping section is smaller than an axial-direction length of the toothed portion of the workpiece, the stopping section includes a stopping surface and a facing surface, and a distance between the stopping surface and the facing surface, where the toothed portion is accommodated, is larger than a tooth thickness of the toothed portion that is accommodated.

Since the machining jig has such a structure, the workpiece is easily mounted on and removed from the holding jig. Therefore, it becomes easy to mount the workpiece on and remove the workpiece from the holding jig by a robot, and the machining of the workpiece can be easily automated.

(7) A processing method according to embodiments of the present invention is such that a workpiece including a ridge that projects from an outer periphery of a cylindrical section in a radial direction and that extends so as to intersect a peripheral direction is machined with a tool such that a processing surface is formed in a direction that intersects a longitudinal direction of the ridge. The processing method includes, by using the machining jig according to any one of (1) to (6) above, stopping the surface of the ridge by the stopping section near a processing portion of the workpiece in an axial direction, and performing processing with the tool from a side opposite to a side where the ridge is stopped by the stopping section.

Since, in the above processing method, machining is performed with the ridge stopped by the stopping section by using the above-described machining jig, it is possible to reduce breakage caused by the machining, and productivity is excellent.

DETAILS OF EMBODIMENTS OF PRESENT INVENTION

Machining jigs according to embodiments of the present invention and a processing method using the machining jigs are described in detail below with reference to the drawings. The same reference signs in the figures denote portions having the same name.

First Embodiment

A machining jig 1 of a first embodiment is described with reference to FIGS. 1 to 4. As shown in FIG. 1, the machining jig 1 of the first embodiment holds a workpiece 100 in a predetermined position with respect to a tool 200, and includes a holding jig 10 and a base 30. The machining jig 1 of the first embodiment further includes a pressing section 50 (FIG. 3) that presses the workpiece 100 against the side of the holding jig 10. The workpiece 100 has the shape of a gear, and, as shown in FIG. 4, includes ridges (large-toothed portions 120d and small-toothed portions 140d) on outer peripheries of cylindrical sections provided in two levels and having different diameters (a large-diameter cylindrical section 120 and a small-diameter cylindrical section 140). The ridges project in a radial direction and extend so as to intersect a peripheral direction. The tool 200 performs machining so as to form a processing surface in a direction that intersects a longitudinal direction of the ridges (in this embodiment, the small toothed portions 140d) of the workpiece 100.

Figure 2:
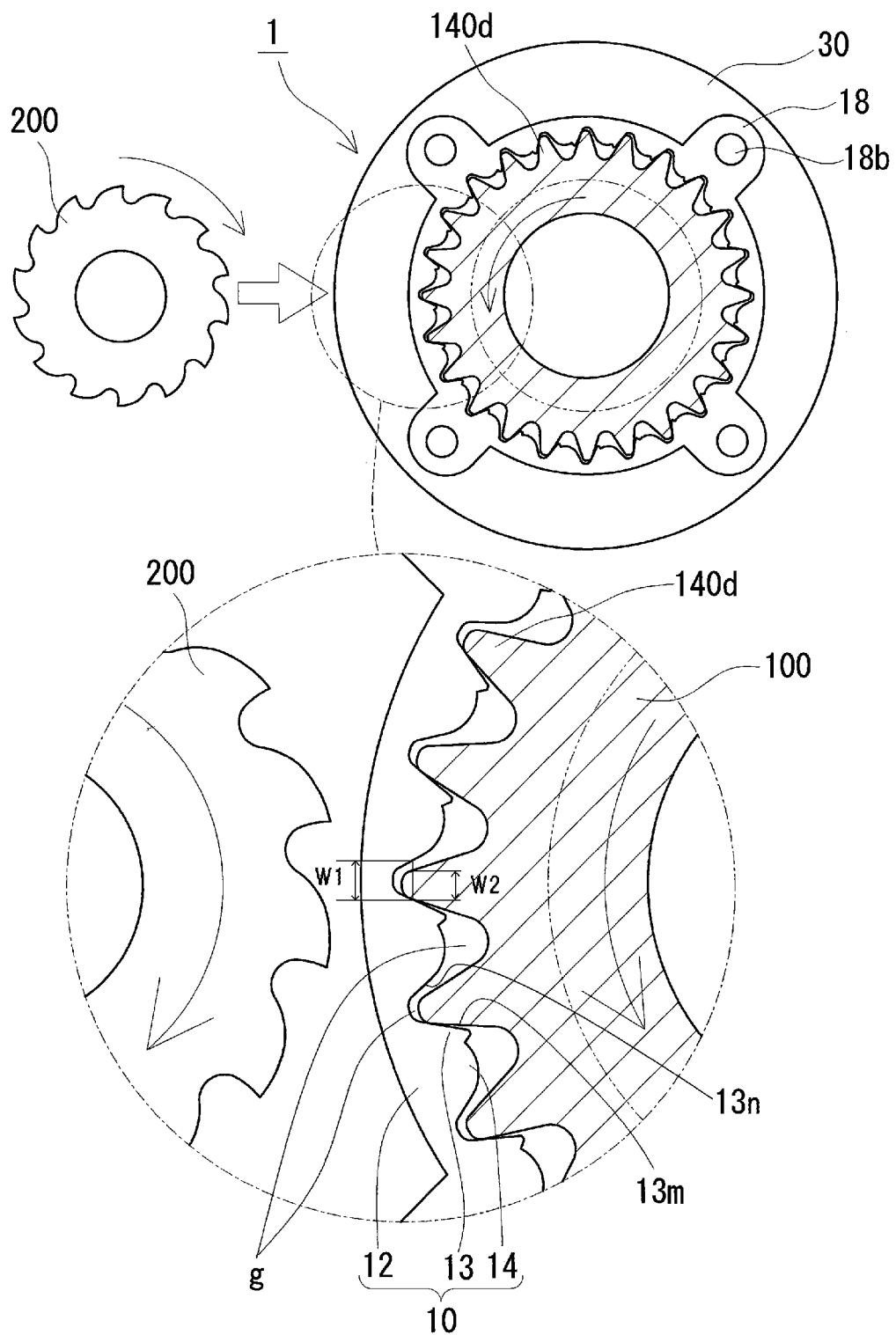
FIG. 2 is a schematic top view showing the machining jig of the first embodiment.
Figure 3:
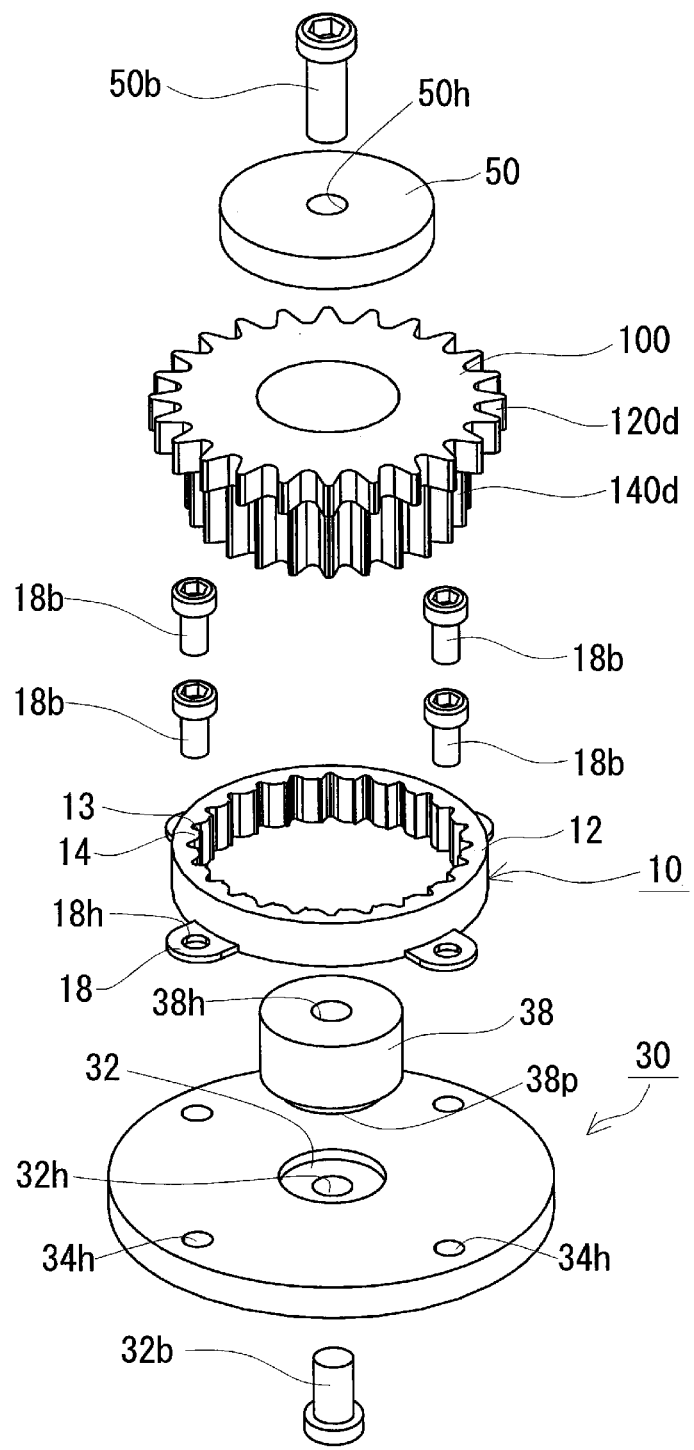
FIG. 3 is a schematic exploded perspective view showing the machining jig of the first embodiment.
Figure 4:
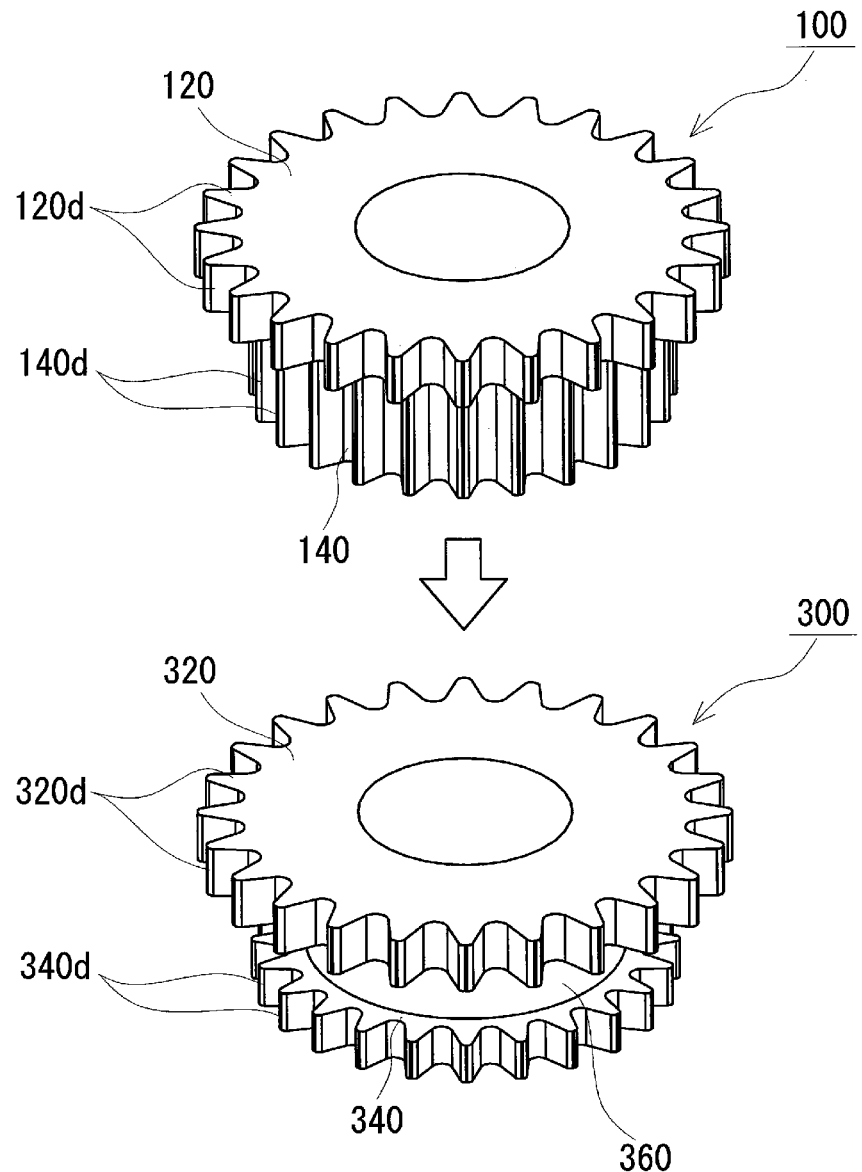
FIG. 4 is a schematic perspective view showing a workpiece to be machined by using the machining jig of the first embodiment and a processed article obtained by the machining.

The holding jig 10 includes a cylindrical body section 12 that is disposed at an outer periphery of the workpiece 100 near a processing portion of the workpiece 100, and stopping sections 13 that project inwardly from the body section 12 (refer to FIGS. 2 and 3). A feature of the machining jig 1 of the first embodiment is that the stopping sections 13 stop, of surfaces of the ridges (small toothed portions 140d), each face (exit-side face) on the side where the tool 200 leaves the processing portion of each small toothed portion 140d. By machining with the exit-side faces of the small toothed portions 140d stopped by the stopping sections 13, it is possible to reduce breakage in the small toothed portions 140d caused by the machining.

A structure of the workpiece 100 and a structure of a processed article 300 obtained by using the machining jig 1 of the first embodiment are described below. Then, each structure of the machining jig 1 is described in detail.

[Workpiece and Processed Article]

In the first embodiment, a form in which a compact (powder compact before sintering) having cylindrical sections provided in two levels and having different diameters as shown in FIGS. 1 and 4 is described. As shown in top view of FIG. 4, the workpiece 100 includes the large toothed portions 120d on an outer periphery of the large-diameter cylindrical section 120 on one end side, and the small toothed portions 140d on an outer periphery of the small-diameter cylindrical section 140 having a length up to the large-diameter cylindrical section 120 from the other end side.

The small toothed portions 140d project in a radial direction and extend so as to intersect (in the embodiment, to be orthogonal to) a peripheral direction at the outer periphery of the small-diameter cylindrical section 140. In the present embodiment, of an outer peripheral surface of the small-diameter cylindrical section 140, a portion of the outer peripheral surface on the side of the large-diameter cylindrical section 120 is machined, and an outer peripheral surface of the workpiece 100 including the small toothed portions 140d is partly removed. By this, as shown in bottom view of FIG. 4, the processed article 300 (a double tooth sprocket) including a large-diameter cylindrical section 320 (the same as 120) having large toothed portions 320d (the same as 120d) on an outer periphery on one end side, a small-diameter cylindrical section 340 (the same as 140) having small toothed portions 340d (the same as 140d) on an outer periphery on the other end side, and a circular cylindrical section 360 (processing surface) that is disposed between the large-diameter cylindrical section 320 and the small-diameter cylindrical section 340, that has a diameter that is smaller than the diameter of the small-diameter cylindrical section 340, and that does not include a toothed portion is obtained.

[Machining Jig]

Holding Jig

As shown in FIGS. 1 to 3, the holding jig 10 includes the circular cylindrical body section 12 that can be disposed at the outer periphery of the workpiece 100, and the stopping sections 13 that project inwardly from the body section 12. The holding jig 10 is disposed near a processing portion of the workpiece 100 in an axial direction, specifically, directly below the processing portion of the workpiece 100. FIG. 2 illustrates a form in which the workpiece 100 and the tool 200 both rotate (spin) clockwise, the tool 200 enters from upper surfaces of the small toothed portions 140d of the workpiece 100, and the tool 200 leaves from lower surfaces of the small toothed portions 140d. In each small toothed portion 140d, a face on the side where the tool 200 enters is an entry-side face and a face on the side where the tool 200 leaves is the exit-side face. As shown in FIG. 2, the holding jig 10 has a function in which each stopping section 13 contacts the exit-side face of the surface of its corresponding small toothed portion 140d of the workpiece 100 and stops the exit-side face of its corresponding small toothed portion 140d while the workpiece 100 is machined.

The body section 12 is a ring-shaped body having a height that, when the workpiece 100 is disposed inside the body section 12, allows a portion of the outer peripheral surface of the workpiece 100 to be machined by the tool 200 to be exposed, and allows each stopping section 13 to stop the exit-side face of its corresponding small toothed portion 140d directly below the processing portion (refer to FIG. 1). An axial-direction thickness of each stopping section 13 is smaller than an axial-direction length of each small toothed portion 140d.

The stopping sections 13 are provided in correspondence with the number of small toothed portions 140d formed in the workpiece 100. In this embodiment, a plurality of stopping sections are uniformly provided in a peripheral direction of the body section 12. The number of stopping sections 13 is the same as the number of small toothed portions 140d. Each stopping section 13 is formed over the entire length of the body section 12 in a height direction thereof. That is, the stopping sections 13 stop the small toothed portions 140d existing directly below the processing portion of the workpiece 100 over a certain length.

As shown in FIG. 2, each stopping section 13 includes a stopping surface 13m that extends along, of the exit-side face of its corresponding small toothed portion 140d, at least a surface of an end-side region of its corresponding small toothed portion 140d in a projection direction thereof, and a facing surface 13n that faces its corresponding stopping surface 13m. When each small toothed portion 140d is machined, the end-side region of each small toothed portion 140d tends to break. Therefore, by stopping the exit-side face at the end-side region of each small toothed portion 140d, it is possible to effectively reduce breakage in each small toothed portion 140d. Each stopping surface 13m is made to extend along the surface of the end-side region at the exit-side face of its corresponding small toothed portion 140d to form a slight gap g between it and a surface of a root-side region of its corresponding exit-side face and a slight gap g between it and a surface of a radial-direction end of its corresponding tip (refer to the lower enlarged view of FIG. 2). The inside diameter of the body section 12 is larger than a tip circle diameter of the small toothed portions 140d, and a distance W1 between each stopping surface 13m and its corresponding facing surface 13n, where the corresponding small toothed portion 140d is accommodated, is larger than a tooth thickness W2 of its corresponding small toothed portion 140d that is accommodated. The distance W1 between each stopping surface 13m and its corresponding facing surface 13n is a radial-direction distance at a location where the stopping surface 13m and its corresponding small toothed portion 140d contact each other, and the tooth thickness W2 of each small toothed portion 140d is a tooth thickness at this location. By forming the gaps g, even if a displacement occurs due to dimensional tolerance of the workpiece 100, it is possible to reliably stop the surface of the end-side region at the exit-side face of each small toothed portion 140d. In addition, by forming the gaps g, the workpiece 100 is easily mounted on and removed from the holding jig 10. Each stopping surface 13m may be a surface along the entire exit-side face of its corresponding small toothed portion 140d.

Each stopping section 13 has a rigidity that does not allow it to deform when the workpiece 100 is being machined. One way to increase the rigidity of each stopping section 13 is to reinforce each stopping section 13. In the present embodiment, bulging sections 14 that are formed continuously with the corresponding stopping sections 13 along the peripheral direction of the body section 12 and that bulge inwardly from the body section 12 are provided. By providing the bulging sections 14 continuously with the stopping sections 13, it is possible to reinforce the stopping sections 13 and to suppress any deformation of the stopping sections 13 caused by a pressing force produced by the tool 200. By providing the bulging sections 14, it is possible to prevent chips produced by the processing from easily entering a portion between the holding jig 10 and the workpiece 100. When the bulging sections 14 are provided, the facing surfaces 13n are formed on the bulging sections 14.

It is desirable that, in the holding jig 10, a gap g be formed between a surface other than each stopping section 13 (stopping surface 13m) and the surface of the workpiece 100. That is, it is desirable that each bulging section 14 have a size that allows a gap g to be formed between it and the surface of the workpiece 100. By providing the gap g between the surface other than the stopping surface 13m of each stopping section 13 and the surface of the workpiece 100, it is easy to mount the workpiece 100 on and remove the workpiece 100 from the holding jig 10. The gap g between the surface other than each stopping surface 13m (surface of its corresponding bulging section 14) and the outer peripheral surface of the workpiece 100 is such that, for example, a minimum length between the surface of each bulging section 14 and the outer peripheral surface of the workpiece 100 is greater than or equal to 0.5 mm.

The holding jig 10 is fixed coaxially with the base 30 described below. In the present embodiment, the holding jig 10 includes mounting sections 18 including bolt holes 18h through which corresponding bolts 18b extend for fixing the holding jig 10 to the base 30. The mounting sections 18 are a plurality of projecting pieces (in the present embodiment, four pieces) that project outward in the radial direction from a lower end of the body section 12. The number of mounting sections 18, the mounting locations of the mounting sections 18, etc. can be changed as appropriate.

Base

As shown in FIG. 3, the base 30 is a plate member having bolt holes 34h for screwing the bolts 18b therein. By causing the bolt holes 34h of the base 30 and the bolt holes 18h of the holding jig 10 to overlap each other, and inserting the bolts 18b into the bolt holes 18h and screwing the bolts 18b into the through holes 34h, it is possible to fix the holding jig 10 to the base 30. The base 30 is set on an installation target (not shown).

The base 30 is fixed coaxially with the holding jig 10. That is, the base 30, the holding jig 10, and the workpiece 100 that is mounted on the holding jig 10 are all coaxially disposed. In the present embodiment, a shaft section 32b is disposed coaxially with the base 30, the holding jig 10, and the workpiece 100. An installation target is, for example, a rotary table that is made rotatable by a driving source (not shown) such as a motor. By coaxially disposing the base 30, the holding jig 10, and the workpiece 100, when the base 30 is rotated, it is possible to rotate (spin) the workpiece 100 around the shaft section 32b as a rotary shaft.

The base 30 has a through hole 32h in a center thereof for inserting the shaft section 32b therein. The base 30 also has a recessed section 32 near the through hole 32h. A cylindrical guide section 38 that has a diameter that is less than or equal to the inside diameter of the workpiece 100 and that has a length that is less than or equal to an axial-direction length of the workpiece 100 is disposed in the recessed section 32. Specifically, by forming a projecting portion 38p on the guide section 38 and fitting the projecting portion 38p to the recessed section 32, the guide section 38 is disposed in the base 30. With the guide section 38 disposed in the base 30, when mounting the workpiece 100 on the machining jig 1, it is possible to cause the workpiece 100 to be placed along an outer periphery of the guide section 38 and the workpiece 100 is easily mounted inside the holding jig 10.

The guide section 38 has a through hole 38h formed in the center thereof for inserting the shaft section 32b therein, and an inner peripheral surface of the through hole 38h has an internal thread. An end portion of the shaft section 32b has an external thread. By fitting the projecting portion 38p of the guide section 38 to the recessed section 32 of the base 30, inserting the shaft section 32b into the through hole 32h of the base 30, and connecting the external thread of the shaft section 30b and the internal thread of the through hole 38h of the guide section 38 to each other, it is possible to fix the guide section 38 to the base 30.

Pressing Section

As shown in FIGS. 1 and 3, the pressing section 50 is a plate member that presses the workpiece 100 against the side of the holding jig 10. The pressing section 50 has a size that allows it to contact an upper end surface of the workpiece 100, and has a through hole 50h formed in the center thereof for inserting a shaft section 50b therein. An end portion of the shaft section 50b has an external thread. By placing the pressing section 50 on the upper end surface of the workpiece 100, inserting the shaft section 50b into the through hole 50h of the pressing section 50, and connecting the external thread of the shaft section 50b and the internal thread of the through hole 38h of the guide section 38, it is possible to press the pressing section 50 against the side of the workpiece 100. By pressing the workpiece 100 against the side of the holding jig 10 by the pressing section 50, it is possible to reliably maintain a state in which the exit-side face of each small toothed portion 140d is stopped by its corresponding stopping section 13.

As a mechanism for pressing the upper end surface of the workpiece 100 against the side of the holding jig 10, it is possible to use a cylinder, such as an air cylinder, in addition to the pressing section 50.

[Use]

The above-described machining jig 1 is capable of being suitably used in machining, such as cutting or grinding, the outer peripheral surface of the workpiece 100, such as a compact obtained by compacting a powdered raw material with a die or a sintered body obtained by sintering the compact. In particular, the machining jig 1 is suitable for machining a compact having a low hardness. In addition, the machining jig 1 is suitable for machining to form an undercut form that is difficult to compact with a die. The workpiece 100 may be a hollow cylindrical section as in the present embodiment, or may be a solid cylindrical member (columnar member or rod-shaped body). The ridges of the workpiece 100 may be orthogonal to a peripheral direction of the workpiece 100 as in the present embodiment, or may have spiral shapes that intersect obliquely in the peripheral direction. Examples of the cutting include cutting using a rotary cutting tool, such as a milling cutter or an end mill, and cutting using a fixed cutting tool, such as a turning tool. Examples of the grinding include grinding using a grinding tool, such as a grinding wheel.

[Processing Method]

A processing method of the first embodiment includes a step of stopping the surface of each ridge (small toothed portion 140d) of the workpiece 100 by its corresponding stopping section 13 by using the above-described machining jig 1, and a step of machining with the tool 200 from a side opposite to the side where each ridge is stopped by its corresponding stopping section 13. It is to be noted that, in the present embodiment, a form in which machining is performed with a side cutter, which rotates and revolves, while the base 30 is fixed to a rotatable installation target and the machining jig 1, that is, the workpiece 100 rotates (spins) is described.

As a precondition, the holding jig 10 is fixed to the base 30 by the bolts 18b. By fitting the projecting portion 38p of the guide section 38 to the recessed section 32 of the base 30 and inserting and screwing the shaft section 32b into the through hole 32h of the base 30 and the through hole 38h of the guide section 38, the guide section 38 is fixed to the base 30. By this, in disposing the workpiece 100 at the machining jig 1, the workpiece 100 is easily mounted on the holding jig 10.

Step of Stopping Ridges (Toothed Portions)

First, the workpiece 100 is mounted inside the body section 12 of the holding jig 10. Specifically, while placing an inner peripheral surface of the workpiece 100 along the outer periphery of the guide section 38, an end portion of the workpiece 100 is placed on an upper surface of the base 30. Since the holding jig 10 is formed such that the gaps g are formed between surfaces other than the stopping sections 13 (stopping surfaces 13m) and the surface of the workpiece 100 (refer to FIG. 2), the workpiece 100 is easily mounted inside the body section 12.

Next, the workpiece 100 is finely adjusted (rotated) in the peripheral direction inside the body section 12 to stop the surfaces of the small toothed portions 140d (specifically, the surfaces of the end-side regions of the small toothed portions 140d in the projection direction) by the stopping sections 13. This is because, since the gaps g are provided between the surfaces other than the stopping sections 13 and the surface of the workpiece 100, merely placing the workpiece 100 on the base 30 inside the body section 12 does not necessarily result in the stopping sections 13 stopping the surfaces of the end-side regions of the small toothed portions 140d in the projection direction.

Lastly, after the small toothed portions 140d have been stopped by the stopping sections 13, the pressing section 50 is disposed on the upper end surface of the workpiece 100, and the shaft section 50b is inserted and screwed into the through hole 50h of the pressing section 50 and the through hole 38h of the guide section 38. This makes it possible to fix the workpiece 100 to the machining jig 1 with the surfaces of the small toothed portions 140d stopped by the stopping sections 13.

The machining jig 1 may be disposed as appropriate near a processing portion of the workpiece 100 along the axial direction of the workpiece 100 such that, of the outer peripheral surface of the workpiece 100, the portion to be machined by the tool 200 is exposed.

Step of Machining

With the surfaces of the small toothed portions 140d stopped, processing is performed with the tool 200 from a side opposite to the side where each small toothed portion 140d is stopped by its corresponding stopping section 13. In the present embodiment, the machining is performed while rotating the machining jig 1 around the shaft section 32b as a center. That is, the workpiece 100 is machined by rotating (spinning) the workpiece 100 around its center axis. By using, as the tool 200, a disk-shaped cutter that spins and that revolves around the workpiece 100, the entire periphery of the workpiece 100 is cut by the tool 200. The spinning axis of the workpiece 100 and the revolution axis of the tool 200 correspond to the shaft section 32b. The spinning direction of the workpiece 100 (counterclockwise arrow in FIG. 2) and the spinning direction of the tool 200 (clockwise arrow in FIG. 2) are opposite to each other. The spinning direction and the revolution direction of the tool 200, itself, are opposite to each other.

Since the machining can be performed with the exit-side face of each small toothed portion 140d of the workpiece 100 stopped, it is possible to suppress, for example, breakage even if the machining is performed under severe conditions such as increasing the processing speed (for example, greater than or equal to 150 m/min, and, further, greater than or equal to 160 m/min). It is possible to considerably reduce the processing time by increasing the processing speed. It is possible to set the processing time to, for example, less than or equal to 20 s/piece, and less than or equal to 15 s/piece, particularly, less than or equal to 10 s/piece.

The processed article (powder compact) obtained by the above-described processing method is such that powder may be missing from the processing surface (surface of the circular cylindrical section 360 in FIG. 4) that has been machined. In addition, a feed mark of the tool 200 remains on the processing surface, and is not deformed and does not disappear even if the processed article is sintered. In the sintered body obtained by sintering the processed article (powder compact) obtained by the above-described processing method, a sintered skin remains on the processing surface obtained by machining the powder compact before the sintering. Therefore, the sintered skin obtained by machining and sintering the compact differs from the sintered skin obtained by machining the sintered body. Specifically, the sintered skin that is obtained by machining and sintering the compact is a sintered skin having a feed mark, and the sintered skin obtained by machining the sintered body is a processing skin having a feed mark.

[Effects]

The machining jig 1 of the first embodiment is capable of suppressing breakage of the small toothed portions 140*d* by only stopping the exit-side face of each small toothed portion 140*d* by its corresponding stopping section 13, so that excellent productivity is provided. Specifically, the above machining jig 1 is used to perform the procedure of mounting the workpiece 100 inside the body section 12 of the holding jig 10 finely adjusting the workpiece 100 inside the body section 12 in the peripheral direction and stopping the small toothed portions 140*d* by the stopping sections 13 machining the vicinity of portions of the small toothed portions 140*d* that have been stopped, to make it possible to obtain the processed article 300 with reduced breakage. Therefore, it is expected that, by using the above machining jig, the manufacturing of, for example, the processed article 300, which is a double tooth sprocket, as shown in FIG. 4 can be automated.

Second Embodiment

Figure 5:
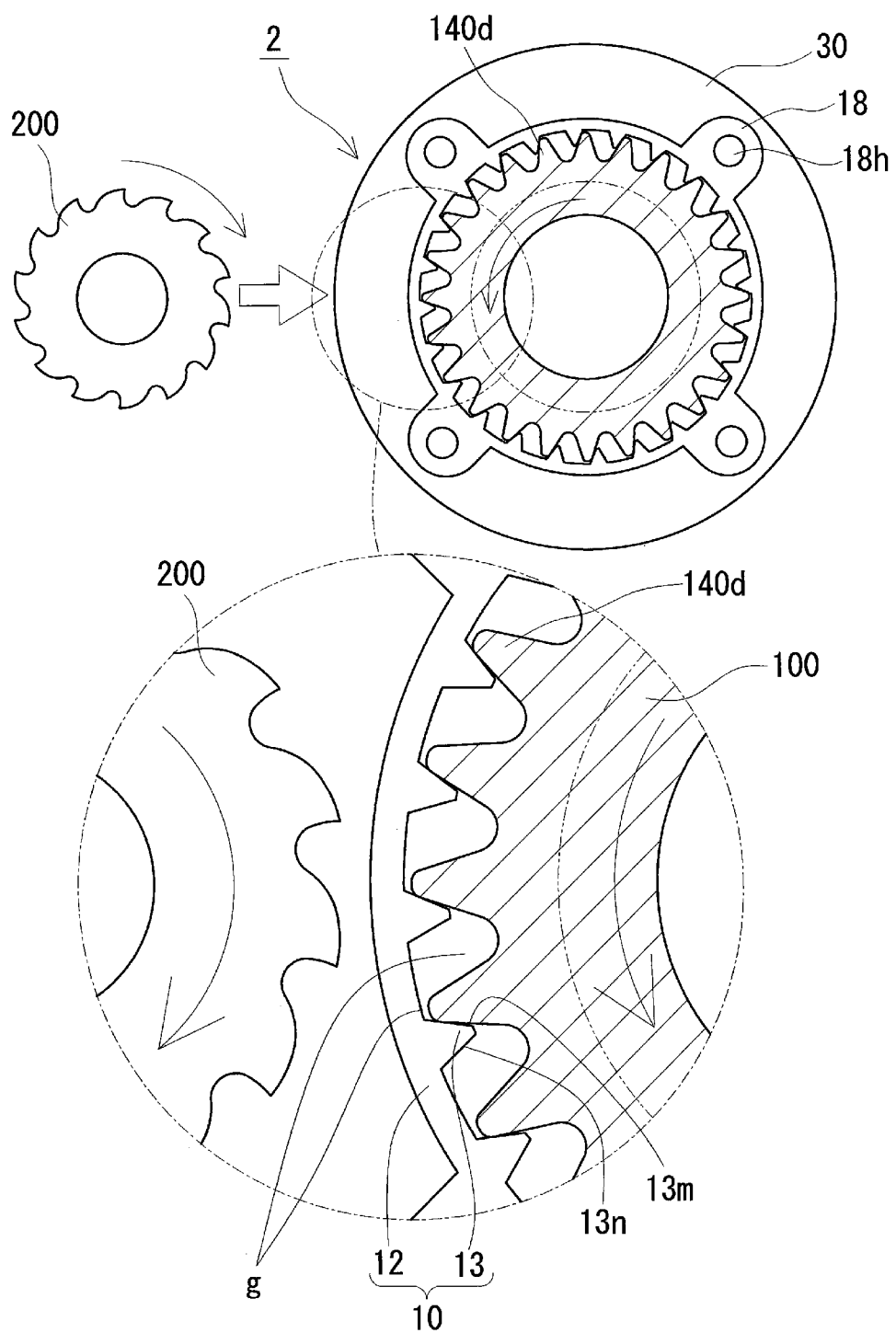
FIG. 5 is a schematic top view showing a machining jig of a second embodiment.

As shown in FIG. 5, in a machining jig 2 of a second embodiment, a holding jig 10 includes stopping sections 13 each having an isosceles trapezoidal shape in cross section and including a stopping surface 13*m* that extends along an exit-side face of its corresponding small toothed portion 140*d* and a facing surface 13*n* that faces its corresponding stopping surface 13*m* at the same inclined surface as the stopping surface 13*m*. Gaps g are formed between the facing surfaces 13*n* and corresponding entry-side faces of adjacent small toothed portions 140*d*. That is, in the machining jig 2 of the second embodiment, a holding jig 10 does not include bulging sections 14 (FIG. 2) described in the first embodiment. Even in the second embodiment, the inside diameter of a body section 12 is larger than a tip circle diameter of the small toothed portions 140*d*, and a distance between each stopping surface 13*m* and its corresponding facing surface 13*n*, where the corresponding small toothed portion 140*d* is accommodated, is larger than a tooth thickness of its corresponding small toothed portion 140*d* that is accommodated. An axial-direction thickness of each stopping section 13 is smaller than an axial-direction length of each small toothed portion 140*d*.

In the machining jig 2, surfaces of end-side regions at the exit-side faces of the small toothed portions 140*d* only need to be capable of being stopped by the corresponding stopping sections 13 (stopping surfaces 13*m*); and the larger a gap g between each surface other than the stopping surfaces 13*m* and the surface of the workpiece 100 is, the more easily the workpiece 100 is mounted on and removed from the holding jig 10. Therefore, it is desirable that each stopping section 13 be small to a degree that does not cause deformation of each stopping section 13 by a pressing force produced by the tool 200. The maximum thickness of each stopping section 13 is approximately greater than or equal to 40% and less than or equal to 60% of the maximum length between adjacent small toothed portions 140*d* of the workpiece 100. In a state in which each stopping section 13 is stopped at a predetermined position of the exit-side face of its corresponding small toothed portion 140*d*, a gap g of approximately 1 mm (dimension measured in a radial direction of the holding jig 10) is provided between the surface of a radial-direction end of a tip of each small toothed portion 140*d* and the surface of the body section 12.

Since each gap g in the machining jig 2 of the second embodiment 2 is larger than each gap g in the machining jig 1 of the first embodiment, the workpiece 100 can be easily mounted on and removed from the holding jig 10. Therefore, by using the machining jig 2 of the second embodiment, it is easier to automate the mounting of the workpiece 100 on and the removal of the workpiece 100 from the holding jig 10 by, for example, a robot; and it is expected that the manufacturing of, for example, the processed article 300, which is a double tooth sprocket, as shown in FIG. 4 can be automated by, for example, a robot.

Experimental Example 1

In partly removing an outer peripheral surface of a compact (workpiece) obtained by compacting a powder raw material with a die, by using the machining jig 2 of the second embodiment, cutting was performed with the compact held with respect to a tool to check for any breakage in a processed article. In the present example, as the compact, a compact obtained by cold-compacting with a die a material in which a lubricant was added to a powder was used. In the present example, the compact (refer to FIGS. 1 and 4) including toothed portions on cylindrical sections having different diameters and provided in two levels was cut over the entire periphery of a portion of the outer peripheral surface of a small-diameter cylindrical section, the portion of the outer peripheral surface being on the side of a large-diameter cylindrical section, so that teeth were removed to manufacture a processed article (refer to FIG. 4), which was a double tooth sprocket, including the large-diameter cylindrical section, the small-diameter cylindrical section, and a circular cylindrical section. The large-diameter cylindrical section included large toothed portions on an outer periphery on one end side, the small-diameter cylindrical section included small toothed portions on an outer periphery on the other end side, and the circular cylindrical section was disposed between the large-diameter cylindrical section and the small-diameter cylindrical section and had a diameter that was smaller than the diameter of the small-diameter cylindrical section. That is, in the present example, the cutting was performed with an exit surface of a surface of each toothed portion stopped by its corresponding stopping section.

The cutting condition was a cutting speed greater than or equal to 150 m/min.

For comparison, cutting was performed without a surface of each toothed portion of a compact being stopped by a stopping section, that is, without doing anything to the toothed portions, to check for any breakage outside an allowable range for its processed article.

The cutting condition was the same as the cutting condition indicated above.

As a result, when the cutting was performed with each toothed portion of the compact stopped by its corresponding stopping section, breakages outside the allowable range occurred in none of 200 compacts. In contrast, when the cutting was performed without stopping each toothed portion of the compact, breakages outside the allowable range occurred in 16 out of 100 compacts. That is, it was found that, by stopping each toothed portion of the compact near a portion to be cut, it is possible to reduce breakage caused by the cutting and to improve yield.

The present invention is not limited to these exemplifications and is indicated by the scope of the claims, and is intended to encompass all meanings equivalent to the scope of the claims and all changes within the scope. It is possible to change as appropriate, for example, the form of the workpiece (whether the material is a compact or a sintered body, the shape, the size, etc.) and the processing condition (whether an undercut form is to be formed). Although, in the present embodiments, the form in which the workpiece rotates (spins) and the tool rotates (spins and revolves) is described, a form in which the workpiece is fixed and the tool rotates (spins and revolves) and a form in which the workpiece rotates (spins) and the tool is fixed (does not spin and revolve) to form a cut are possible.

REFERENCE SIGNS LIST 1, 2 machining jig
10 holding jig
   12 body section
   13 stopping section 13m stopping surface 13n facing surface
   14 bulging section
   18 mounting section 18h bolt hole 18b bolt
   g gap
30 base
   32 recessed section 32h through hole 32b shaft section 34h bolt hole
   38 guide section 38p projecting portion 38h through hole
   50 pressing section 50h through hole 50b shaft section
100 workpiece
   120 large-diameter cylindrical section 140 small-diameter cylindrical section
   120d large toothed portion 140d small toothed portion
200 tool
300 processed article
   320 large-diameter cylindrical section 340 small-diameter cylindrical section 360 circular cylindrical section
   320d large toothed portion 340d small toothed portion
W1 distance between stopping surface and facing surface
W2 tooth thickness

The invention claimed is:

1. A machining jig that holds a workpiece when machining the workpiece with a tool, the workpiece including a ridge that projects from an outer periphery of a cylindrical section in a radial direction and that extends so as to intersect a peripheral direction, the machining jig comprising:
a holding jig that includes a cylindrical body section that is disposed at an outer periphery of the workpiece;
wherein the workpiece has a form of gear, and
wherein the ridge is a toothed portion of the gear,
wherein each toothed portion has an entry-side face on a first side thereof where the tool enters a processing portion of the toothed portion and an exit-side face on a second side thereof where the tool leaves the processing portion of the toothed portion, the second side being opposite the first side,
wherein the holding jig includes a stopping section that projects inwardly from the body section and that stops the exit-side face of the toothed portion where the tool leaves the processing portion of the toothed portion; and
a base that is coaxial with the holding jig and to which the holding jig is coaxially fixed.

2. The machining jig according to claim 1, wherein the stopping section stops at least a surface of an end-side region of the ridge in a projection direction thereof.

3. The machining jig according to claim 1, wherein the holding jig is such that a gap is formed between a surface other than the stopping section and a surface of the workpiece.

4. The machining jig according to claim 1, further comprising a pressing section that presses the workpiece against a side of the holding jig.

5. The machining jig according to claim 1, further comprising a circular cylindrical guide section that is coaxial with the holding jig and that is formed on an inner side of the holding jig,
wherein an inside diameter of the body section is larger than a tip circle diameter of the toothed portion,
wherein the number of the stopping sections is same as the number of the toothed portions,
wherein an axial-direction thickness of the stopping section is smaller than an axial-direction length of the toothed portion of the workpiece, and
wherein the stopping section includes a stopping surface and a facing surface, and a distance between the stopping surface and the facing surface, where the toothed portion is accommodated, is larger than a tooth thickness of the toothed portion that is accommodated.

6. A processing method in which a workpiece including a ridge that projects from an outer periphery of a cylindrical section in a radial direction and that extends so as to intersect a peripheral direction is machined with a tool such that a processing surface is formed in a direction that intersects a longitudinal direction of the ridge, the method comprising:
by using the machining jig according to claim 1, stopping the exit-side face of the toothed portion by the stopping section near the processing portion of the toothed portion in an axial direction, and performing processing with the tool from a side opposite to a side where the toothed portion is stopped by the stopping section.

7. A machining jig that holds a workpiece when machining the workpiece with a tool, the workpiece including a ridge that projects from an outer periphery of a cylindrical section in a radial direction and that extends so as to intersect a peripheral direction, the machining jig comprising:
a holding jig that includes a cylindrical body section that is disposed at an outer periphery of the workpiece and a stopping section that projects inwardly from the body section and that stops a face of a surface of the ridge on a side where the tool leaves a processing portion of the ridge; and
a base that is coaxial with the holding jig and to which the holding jig is coaxially fixed,
wherein the workpiece has a form of a gear, and
wherein the ridge is a toothed portion of the gear,
further comprising a circular cylindrical guide section that is coaxial with the holding jig and that is formed on an inner side of the holding jig,
wherein an inside diameter of the body section is larger than a tip circle diameter of the toothed portion,
wherein the number of the stopping sections is same as the number of the toothed portions,
wherein an axial-direction thickness of the stopping section is smaller than an axial-direction length of the toothed portion of the workpiece, and
wherein the stopping section includes a stopping surface and a facing surface, and a distance between the stopping surface and the facing surface, where the toothed portion is accommodated, is larger than a tooth thickness of the toothed portion that is accommodated.

* * * * *